United States Patent
Berzon et al.

(10) Patent No.: US 6,572,794 B1
(45) Date of Patent: Jun. 3, 2003

(54) METHOD OF MANUFACTURING A PHOTOCHROMIC MOLDED ARTICLE

(75) Inventors: Ronald A. Berzon, St. Petersburg, FL (US); Steve Weber, Clearwater, FL (US); Gilles Richard, Quincy Voisins (FR); Daniel Darmes, Pontault Combault (FR); Yassin Turshani, Largo, FL (US)

(73) Assignee: Essilor International Compagnie Generale d'Optique, Charenton cedex (FR)

( * ) Notice: Subject to any disclaimer, the term of this patent is extended or adjusted under 35 U.S.C. 154(b) by 227 days.

(21) Appl. No.: 09/621,933

(22) Filed: Jul. 24, 2000

(51) Int. Cl.⁷ ............................................. B29D 11/00
(52) U.S. Cl. ...................... 264/1.38; 264/489; 264/492
(58) Field of Search ................................ 264/1.36, 1.38, 264/1.1, 489, 492; 425/808

(56) References Cited

U.S. PATENT DOCUMENTS

| | | | |
|---|---|---|---|
| 5,066,818 A | 11/1991 | Gemert et al. | 549/389 |
| 5,114,621 A | 5/1992 | Guglielmetti et al. | 252/586 |
| 5,139,707 A | 8/1992 | Guglielmetti et al. | 252/586 |
| 5,547,618 A | 8/1996 | Magne | 264/1.36 |
| 5,621,017 A | 4/1997 | Kobayakawa et al. | 522/16 |
| 5,662,839 A | 9/1997 | Magne | 264/1.38 |
| 5,851,328 A | 12/1998 | Kohan | 156/102 |
| 5,910,516 A | 6/1999 | Imura et al. | 522/39 |
| 6,068,797 A | 5/2000 | Hunt | 264/1.7 |
| 6,228,289 B1 * | 5/2001 | Powers et al. | 264/1.38 |

FOREIGN PATENT DOCUMENTS

| | | | |
|---|---|---|---|
| EP | 401958 | | 12/1990 |
| EP | 562915 | | 9/1993 |
| GB | 2 240 851 | * | 8/1991 |
| JP | 3251587 | | 11/1991 |
| WO | WO 92/09593 | | 6/1992 |
| WO | WO 93/17071 | | 9/1993 |
| WO | WO 96/04590 | | 2/1996 |
| WO | WO 00/19246 | | 4/2000 |

* cited by examiner

*Primary Examiner*—Mathieu D. Vargot
(74) *Attorney, Agent, or Firm*—Fulbright & Jaworski L.L.P.

(57) ABSTRACT

A method of manufacturing a photochromic molded article which comprises the steps of:

filling a mold with a photopolymerizable monomer composition containing a photopolymerizable monomer, a photoinitiator and a photochromic compound capable of coloring upon UV irradiation;

pre-heating the composition to a temperature which reduces or prevents coloration of the photochromic compound during the subsequent photopolymerization step; and photopolymerizing the composition under irradiation with a light comprising a UV portion and a UV-visible portion.

19 Claims, No Drawings

METHOD OF MANUFACTURING A PHOTOCHROMIC MOLDED ARTICLE

BACKGROUND OF THE INVENTION

1. Field of the Invention

The present invention relates to a method of manufacturing a photochromic molded article through photopolymerization of a photopolymerizable composition comprising at least one photopolymerizable monomer, at least one photoinitiator and at least one photochromic compound, and in particular to such a method which allows fast photopolymerization of the composition without degrading the photochromic compound.

2. Description of the Prior Art

Photopolymerizable compositions and in particular photopolymerizable compositions for making ophthalmic lenses are usually molded by filling the cavity of a two-part mold made of transparent mineral glass with a liquid photopolymerizable monomer composition and by irradiating the composition with an appropriate UV-light for polymerizing the composition.

A mold and an apparatus typically used for molding ophthalmic lenses are disclosed in U.S. Pat. Nos. 5,547,618 and 5,662,839.

Only one lens at a time can be molded using such a mold and apparatus and therefore the lens manufacturing efficiency is highly depending upon the duration of the irradiation polymerization step, at least up to a degree of polymerization at which the composition is sufficiently cured to become self-supporting or to be safely handled.

Document U.S. Pat. No. 5,621,017 discloses a method for producing photochromic cured products which comprises irradiating a photopolymerizable monomer composition including a photopolymerizable monomer, a photoinitiator and a photochromic compound. The amount of photochromic compound that can be incorporated in the composition must be kept in a very narrow range of 0.001 to 0.2 parts by weight and, preferably, of not smaller than 0.01 part by weight but smaller than 0.1 part by weight with respect to 100 parts by weight of the polymerizable monomer.

When the amount of photochromic compound is not larger than 0.001 parts by weight, the photochromic property is not obtained with sufficient degree of color concentration.

When the amount of the photochromic compound is larger than 0.2 parts by weight, on the other hand, the polymerization with light is not completed, in a short period of time. When the polymerizable monomer is not polymerized to a sufficient degree, photochromic property tends to be deteriorated within a short period of time.

Preferably, the photoinitiator used in the compositions of U.S. Pat. No. 5,621,017 exhibits a main absorption in an ultraviolet region and a molar absorption coefficient at 400 nm of larger than 150 lit./mol.cm, i.e. the photoinitiator has preferably a sufficient absorption in the visible region.

This method has several disadvantages.

During photopolymerization, the photochromic compound is submitted to intense UV radiation, which according to the prior art and in particular to U.S. Pat. No. 5,910,516, has two consequences:

The darkening of the photochromic compound which then filters UV-visible rays consequently limits the effectiveness of the photoinitiator activation. Therefore, the time necessary for polymerizing and achieving the final degree of polymerization or a degree of polymerization sufficient for a safe handling of the molded article is lengthened.

Prolonged irradiation for completing polymerization increases the risk of degrading the photochromic compound.

In order to solve the above technical problems, U.S. Pat. No. 5,910,516 describes the use of a UV filter capable of eliminating ultraviolet light having a wavelength below 400 nm. Elimination of the shorter UV light from the irradiation beam does effectively suppress or reduce the color development of the photochromic compound.

Although this method slightly increases the polymerization rate, as the photoinitiator can be activated by UV-visible radiations having wavelengths around 400 nm, the major part of the UV irradiation does not reach the photoinitiator and consequently cannot activate it.

Thus, there is still a need to provide a faster UV polymerization method for the molding of photochromic articles and especially for compositions including higher amounts of photochromic compounds and which leads to ophthalmic lenses having excellent photochromic performance (high colorability, high speed of darkening and lightening, resistance to photodegradation, and good durability of photochromic properties).

SUMMARY OF THE INVENTION

The object of the present invention is achieved by providing a method of manufacturing a photochromic molded article, such as an ophtalmic lens, comprising the steps of:

(a) filling a mold with a photopolymerizable monomer composition containing:
   at least one photopolymerizable monomer;
   at least one photoinitiator exhibiting a main absorption in a UV region; and
   at least one photochromic compound capable of coloring upon UV irradiation;

(b) photopolymerizing said photopolymerizable composition under irradiation with a light comprising a UV portion and UV-visible portion; wherein,
   before the beginning of the photopolymerization step, said photopolymerizable composition is subjected to a pre-heating step in which the temperature of said photopolymerizable composition is increased to a temperature reducing or preventing coloration of said at least one photochromic compound during the subsequent photopolymerization step.

DETAILED DESCRIPTION OF PREFERRED EMBODIMENTS

The pre-heating step comprises heating the photopolymerizable composition at a temperature above the ambient temperature (ambient temperature meaning $\leq 25°$ C.) at which the photochromic compound is predominantly in a non-excited state or uncolored form even at the beginning of the irradiation by the UV light. Usually, the pre-heating comprises heating the photopolymerizable composition to a temperature ranging from 30 to 90° C., preferably from 40 to 60° C. and typically around 50° C.

The pre-heating step can be performed using any classical means such as air oven heating, hot-water heating, infra-red radiation heating and microwave heating.

The photopolymerizable monomer composition can be pre-heated while in the mold cavity, before beginning photopolymerization, or it can be pre-heated before being poured in the mold cavity. In any case, the photopolymerizable composition must be at a temperature higher than ambient temperature ($\leq 25°$ C.) and sufficient to at least reduce, and preferably prevent photochromic compound coloration during the photopolymerization step.

The photopolymerization step of the process of the invention is classical and generally comprises irradiating the photopolymerizable composition with a light comprising UV radiations. Preferably, the irradiation light also comprises a UV-visible portion having a wavelength spectrum around 400 nm.

Preferably also, the photopolymerization step comprises a pre-polymerization step in which the composition is irradiated with a UV light, preferably including a UV-visible portion around 400 nm, at a first intensity, followed by a further polymerization step with a UV light, preferably also including a UV-visible portion around 400 nm, at a second intensity higher than the first intensity.

By a UV-visible light portion around 400 nm, it is intended a light having a wavelength spectrum of 380 to 450 nm.

Usually, the UV light has a wavelength spectrum of 250 to 400 nm.

The pre-polymerization step, which is preferably of a short duration, generally will allow for obtaining a sufficient polymerization degree of the composition so that the pre-polymerized article is self-supporting and can be safely handled.

Generally, the pre-polymerization step can last from 1 second to 10 minutes and preferably 5 seconds to 1 minute.

The photopolymerizable monomers of the composition of the present invention may be any known monomer having a radical polymerizing group such as, for example, acrylate group, methacrylate group, vinyl group, and the like. Mixtures of such radical polymerizing monomers may be used.

A preferred class of radical polymerizing monomers are monomers of formula (I):

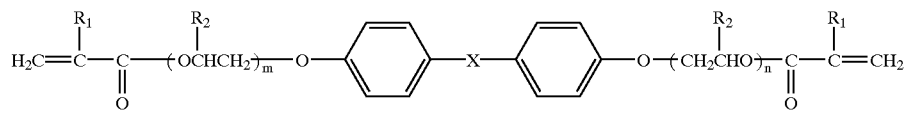

wherein
$R_1$ and $R_2$, independently of each other, may represent hydrogen or a lower $C_1$-$C_6$ alkyl radical, X represents —O—, —S—, —CO—, —CH$_2$—, —CH=CH—, or —C(CH$_3$)$_2$—, m and n are integers, and the sum m+n has an average value ranging from 0 to 40, preferably 0 to 10, more preferably 2 to 7.

Particularly, preferred monomers having formula (I) are those wherein $R_1$ is $CH_3$ and $R_2$ is hydrogen and X represents —C(CH$_3$)$_2$— and m+n has an average value of 2 to 7, and in particular m+n is 2 to 4.

A particularly preferred monomer of formula (I) is 2,2-bis(4-methacryloxy diethoxy phenyl) propane.

Preferably, the monomer of formula (I) represents at least 50% by weight and preferably 70 to 100% by weight based on the total weight of the polymerizable monomers present in the composition.

Among other radical polymerizable monomers that can be used in the present invention, there may be cited: a vinylbenzyl compound represented by the general formula (II)

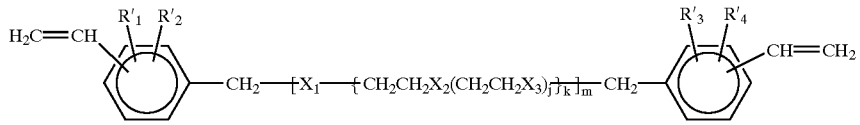

wherein $R'_1$, $R'_2$, $R'_3$ and $R'_4$ may be the same or different and are halogen atoms, $X_1$, $X_2$ and $X_3$ are oxygen atoms or sulfur atoms, j, k and m are 0 or 1, respectively, and j=0 when k=0 or k=j=0 when m=0, but $X_1$, $X_2$ and $X_3$ are not simultaneously sulfur atoms when m=k=j=1.

Specific examples of the radical polymerizable monomer that can be favorably used in the present invention include the following compounds: diacrylate compounds or dimethacrylate compounds, such as diethylene glycol dimethacrylate, triethylene glycol dimethacrylate, tetraethylene glycol dimethacrylate, butanediol dimethacrylate, hexamethylene dimethacrylate, 2,2-bis(4-methacryloyloxyethoxy-3,5-dibromophenyl) propane, and 2,2-bis(4-methacryloyloxyethoxyphenyl)propane; acrylate compounds or methacrylate compounds having an epoxy group, such as glycidyl acrylate, glycidyl methacrylate, beta-methylglycidyl acrylate, beta-methylglycidyl methacrylate and bisphenol A-monoglycidyl ether methacrylate; and vinylbenzyl compounds, such as bis-4-vinylbenzyl ether, bis-4-vinylbenzyl sulfide, 1;2-(p-vinylbenzyloxy) ethane, 1,2-(p-vinylbenzylthio) ethane, bis-(p-vinylbenzyloxyethyl)sulfide, etc., together with other radical polymerizable monomers that are copolymerizable therewith.

Examples of other radical polymerizable monomers that can be used with the above mentioned monomers, and in particular monomers of formula (I), include unsaturated carboxylic acids such as acrylic acid, methacrylic acid, maleic anhydride, and fumaric acid; acrylic and methacrylic ester compounds such as methyl acrylate, methyl methacrylate, benzyl methacrylate, phenyl methacrylate, tribromophenyl methacrylate, 2-hydroxyethyl methacrylate, bisphenol-A dimethacrylate, trifluoromethyl methacrylate, urethane acrylate and epoxy acrylate; fumaric ester compounds such as monomethyl fumarate, diethyl fumarate and diphenyl fumarate; allyl compounds such as diallyl phthalate, diallyl terephthalate, diallyl isophthalate, diallyl epoxysuccinate, diallyl maleate, allyl cinnamate, allyl isocyanate, diallyl chlorendate, diallyl hexaphthalate, diallyl carbonate, and allyl diglycol carbonate; and aromatic vinyl compounds such as styrene, chlorostyrene, alpha-methylstyrene, alpha-methylstyrene dimer, vinyl naphthalene, isopropenyl naphthalene, bromostyrene and divinylbenzene. These monomers may be used in a single kind or being mixed together in two or more kinds.

Another class of radical polymerizable monomers which can be used preferably with monomers of formula (I) are bisphenol-A poly (alcoxylate) diméthacrylate such as bisphénol-A 30 ethoxylate diméthacrylate.

For the purpose of improving the performance of the photochromic compound(s), it may be desirable to add plastifying agents and especially aromatic ring containing inert plasticizers.

Such kind of plasticizers are described in WO patent application WO 95/10790 and are incorporated herein by reference.

A preferred plasticizer is a poly(ethyleneglycol) of molecular weight 200 benzoate-terminated at both ends.

As the photopolymerization initiator, any widely known compound can be used without limitation that is added for photopolymerizing the radical polymerizable monomers. Among the photopolymerization initiators that can be suitably used in the present invention, it is desired to use an acetophenone photopolymerization initiator, an α-dicarbonyl photopolymerization initiator, an acylphosphine oxide photopolymerization initiator and a bisacylphosphine oxide photopolymerization initiator from the standpoint of favorably carrying out the photopolymerization and obtaining the polymer with no color. More specifically speaking, it is desired to use the compounds represented by the following formulas (III), (IV) and (V)

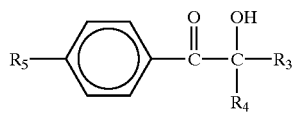  (III)

wherein $R_3$ and $R_4$ are alkyl groups which together may form a cyclohexane ring, and $R_5$ is an alkyl group or a hydrogen atom,

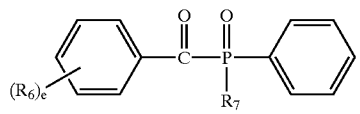  (IV)

wherein $R_6$ is the same or different and is a methyl group, a methoxy group or a chlorine atom, e is 2 or 3, and $R_7$ is phenyl group or methoxy group,

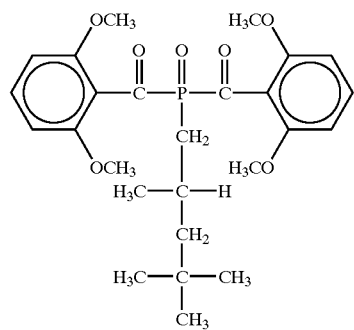  (V)

Examples of photopolymerization initiators that can be preferably used in the present invention are as described below:

Acetophenone Polymerization Initiators
1) 1-Phenyl-2-hydroxy-2-methylpropane-1-one,
2) 1-Hydroxycyclohexylphenyl ketone, and
3) 1-(4-Isopropylphenyl)-2-hydroxy-2-methylpropane-1-one.

α-Dicarbonyl Compounds
1) 1,2-Diphenylethanedione, and
2) Methylphenylglyoxylate.

Acylphosphine Oxide Photopolymerization Initiators
1) 2,6-Dimethylbenzoyldiphenylphosphine oxide,
2) 2,4,6-Trimethylbenzoyldiphenylphosphine oxide,
3) Methyl 2,4,6-trimethylbenzoyldiphenylphosphinate ester,
4) 2,6-Dichlorobenzoyldiphenylphosphine oxide, and
5) 2,6-Dimethoxybenzoyldiphenylphosphine oxide.

These photopolymerization initiators can be used in a single kind or in a combination of two or more kinds.

Bisacylphosphine Oxide Photo Polymerization Initiators
1) Bis(2,6-dimethoxybenzoyl)-2,4,4-trimethylpentylphosphine oxide.

Among the above-mentioned photopolymerization initiators, those that have a main absorption in the ultraviolet region and have a molar absorption coefficient at 400 nm of not smaller than 150 lit./mol-cm can be effective even by using visible light and are desired since they deteriorate photochromic compounds little during the polymerization.

Specific examples include:
1) 2,4,6-Trimethylbenzoylphenylphosphine oxide, and
2) Bis(2,6-dimethoxybenzoyl)-2,4,4-trimethylpentylphosphine oxide.

The preferred photo-initiators are the following photo-initiators commercialized by CIBA-GEIGY:

Irgacure® 184

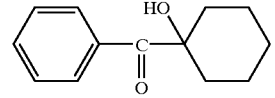

Irgacure® 819

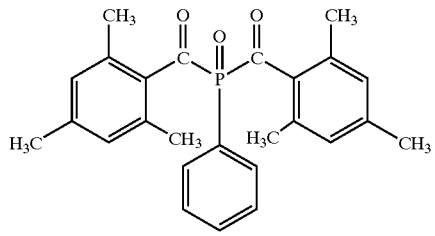

Irgacure® 1850

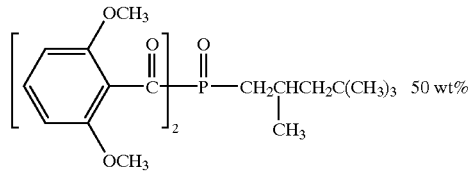

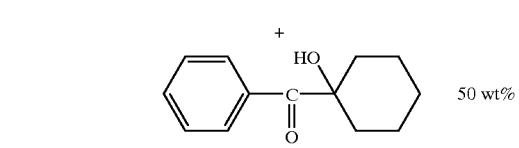

In the present invention, the photo-initiator is added in usual amounts, namely from 0.005 to 1 part by weight and, preferably, from 0.05 to 1 part by weight per 100 part by weight of polymerizable monomers.

Preferably, the composition of the present invention does not contain any thermal initiator.

If some thermal initiators are used, which is not recommended, one may choose thermal initiators forming radicals at a temperature higher than the temperature of the preheating step.

Some specific organic peroxides that are stable at moderate temperature can be used, especially OO-t-amyl-0-(2-ethylhexyl)-monoperoxycarbonate, OO-t-butyl-0-(2-ethylhexyl)-monoperoxycarbonate. The half lives of these two initiators are higher than 100,000 hours at 50° C. meaning that very few radicals are formed at 50° C. to sufficiently result in polymerization during the preheating step.

The photochromic compound of the composition of the invention can be any known organic photochromic compound including those used in the optical field.

The preferred photochromic compounds are spirooxazine, chromene and fulgides compounds. The chromene compounds and especialy naphtopyrans are most preferred.

Photochromic spirooxazine compounds are compounds which are well known in the art and are disclosed, inter alia, in patents U.S. Pat. No. 5,139,707 and U.S. Pat. No. 5,114,621 (spiro(indoline-quinazolinoxazine) and (spiro(indoline-benzothiazolooxazine)), EP-A-0,245,020 (spiro[indoline-[2, 3']-benzoxazine]), JP-A-03251587 (spiro[indoline-[2, 3']-benzoxazine] substituted at the 6' position) and WO-96/04590 (spiro[indoline-[2, 3']-benzoxazine] having a cyano or phenylsulphonyl group at the 6' position).

Chromenes are also well known photochromic compounds. These compounds are disclosed, inter alia, in patents U.S. Pat. No. 5,066,818, WO-92/09593, EP-A-0,401,958, EP-A-0,562,915 and WO-93/17071.

The compositions of the invention can include a single photochromic compound or a mixture of two or more photochromic compounds.

The amount of photochromic compounds that can be used in the photopolymerizable compositions may range from 0.001 to 1.0 parts by weight, preferably 0.05 to 0.5 parts by weight, per 100 parts by weight of the photopolymerizable monomers.

Using the process of the present invention, even with compositions including more than 0.2 parts by weight of photochromic compound, there is obtained a fast polymerization without degradation of the photochromic properties.

The photopolymerizable composition can contain, as necessary, in the usual amounts, various stabilizers and additives such as mold-releasing agent, an ultraviolet absorber, an ultraviolet stabilizer, an antioxydant, a coloring inhibitor, an anti-yellowing agent, a whitening agent, an antistatic agent, a fluorescent dye, a dye, a pigment, a perfume or the like.

According to the manufacturing process of the invention, there can be produced in a short time a photochromic cured product which is free from deterioration of the photochromic compound and which exhibits photochromic performances, in particular photochromic spectrokinetic performances, equal or even better than prior art photochromic products. Therefore, the cured product is useful as an organic lens having photochromism, in particular a photochromic opthalmic lens.

EXAMPLES

The present invention is hereinafter described by way of examples, but is not intended to be restricted to these examples. In the examples, unless otherwise stated, "percentage" and "part" refer to "percentage by weight" and "part by weight".

Example 1

The following base composition was used to prepare photochromic compositions containing different amounts of a photochromic compound.

Base composition: methacrylic composition CR424 (tradename) marketed by the PPG Company.

To 100 parts by weight of the above base composition, there were added in parts by weights:

| | |
|---|---|
| 3-methyl-2-butene-1 ol (Mbol anti-yellowing agent) | 0.75 |
| triphenyl phosphine TPP (Stabilizer): | 0.3 |
| Irgacure ® 1850 (photoinitiator) | 0.08 |

To the resulting composition, there was added 0.12 parts by weight or 0.24 parts by weight of the PC1 photochromic compound:

PC1 is a mixture of two photochromic naphto[1,2-b] pyrans described in U.S. Pat. Nos. 5,656,206 and 5,645,767, one exhibiting a blue color when irradiated with UV light, the other exhibiting a yellow-orange color when irradiated with UV light.

2 mm flat molds were separated either by a rubber gasket or taped edges. The cavity of the molds was filled with the above photochromic compositions. Some of the filled molds were placed in a water bath and warmed to 50° C. for 15 minutes. All the filled molds, whether at ambient temperature (23° C.) or warmed at 50° C., were then irradiated for pre-cure using a Dymax Light-Welder apparatus with a light produced by a In/Ga doped Hg UV lamp at an intensity of 41–47 mW/cm$^2$ for 10 seconds. The compositions were further exposed for 2 minutes at 150 mW/cm$^2$ using an IST Fe doped Hg lamp in the absence of heat to complete the cure.

After stopping the UV irradiation of the precuring step, each lens/mold assembly is immediately removed from the precuring apparatus and the color of the precured lens composition is immediately observed before it turns colorless. If a color is detected, it means that the lens took a coloration during the precuring step. The results of observation (color) are mentioned in Table (I). After complete cure, % conversion, yellow index and transmission were measured, the photochromic compound being in a non activated state, i.e. not subjected to UV light. The results are also given in Table I.

TABLE I

| | Pre-cure | | Full cure | | |
|---|---|---|---|---|---|
| Formulation | Temperature (° C.) | Color | % conversion | YI | T (%) |
| (c1) 0.00 PC1 control | 23* | colorless | 94 | 0.84 | 90 |
| | 50 | colorless | 95 | 0.88 | 90 |
| (1) 0.12 PC1 | 23* | dark | 95 | 3.9 | 87 |
| | 50 | Very light color | 96 | 2.7 | 86 |
| (2) 0.24 PC1 | 23* | Dark | 95 | 5.1 | 85 |
| | 50 | Very light color | 96 | 3.4 | 84 |

*comparative

The results in Table I clearly show that the pre-heating step of the invention prior to pre-cure UV irradiation maintains the photochromic compound in its closed or deactivated state during the UV precuring, by the very light color. Similar final conversion percentages and transmission are obtained for the fully cured lenses. Better yellow index (YI) are obtained using the method of the invention.

Percentage of conversion is measured on a Perkin-Elmer Lambda 9 NIR spectrophotometer, or an IFS25 spectrophotometer (BRUCKER) IR and NIR, by monitoring the disappearance of the harmonic band of the methacrylate at γ=6290 to 6105 cm$^{-1}$. The percentage of conversion is calculated from the integration of these peaks.

Transmission is measured using a Perkin-Elmer Lambda 9 NIR spectrophotometer according to ASTM E 308 and Z80.1 procedures.

The yellow index is measured according to ASTM D-1925-70 procedure $$YI = \frac{100(1.28X - 1.06Z)}{Y}$$

where X, Y, Z are the trichromatic coordinates of the sample measured using a UV-visible spectrophotometer scanning the spectrum from 380 to 780 nm.

The lower is the Yi of the cured material, the better is the material as it means that the lens has a low yellowness level.

Example 2

The procedure of Example 1 is reproduced, but the 0.08 parts of photo-initiator Irgacure® 1850 were replaced by a mixture of 0.04 parts of Irgacure® 819 and 0.04 parts of Irgacure® 184.

The results are given in Table II.

TABLE II

| | Pre-cure | | Full cure | | |
|---|---|---|---|---|---|
| Formulation | Temperature (° C.) | Color | % conversion | YI | T (%) |
| (c2) 0.00 PC1 control | 23* | Colorless | 94 | 0.75 | 90 |
| | 50 | Colorless | 95 | 0.77 | 90 |
| (3) 0.12 PC1 | 23* | dark | 94 | 4.8 | 85 |
| | 50 | Light purple | 95 | 2.9 | 87 |
| (4) 0.24 PC1 | 23* | dark | 93 | 5.2 | 84 |
| | 50 | Light purple | 94 | 3.2 | 84 |

*comparative

Similar results as in Example 1 are obtained.

Example 3

Photochromic compositions are prepared using the composition of example 1, but replacing the 0.08 parts of photo-initiator Irgacure® 1850 by 0.10 parts of Irgacure® 819 and the photochromic compound by 0.08 parts of PC1, Berry Red and Plum Red photochromic compounds, respectively.

The Berry Red is a naphtopyran dye from James Robinson of formula

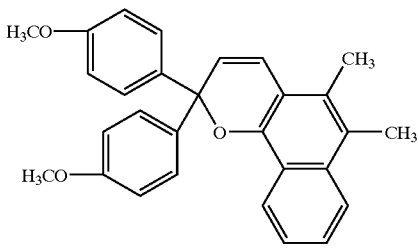

The Plum Red is a spirooxazine dye from James Robinson of formula:

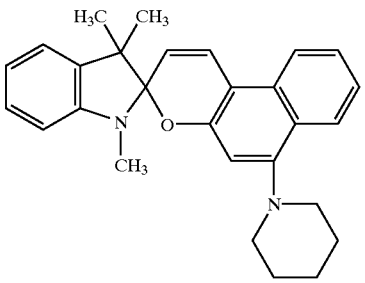

The results are given in Table III

TABLE III

| | Pre-cure | | |
|---|---|---|---|
| Formulation | Temp. (° C.) | Color | % conversion |
| (5) 0.08 PC1 | 25* | deep gray | 66 |
| | 50 | light gray | 94 |
| (6) 0.08 Berry Red | 25* | deep red | 89 |
| | 50 | light red | 94 |
| (7) 0.08 Plum Red | 25* | deep red | 78 |
| | 50 | medium red | 97 |

*comparative

Example 4

Compositions are prepared as in Example 1 but using 0.12 parts and 0.30 parts of photochromic compounds PC1.

The compositions are polymerized as in Example 1 but with a pre-cure intensity of 14 mW/cm$^2$ and variable pre-cure time. Pre-cure time and results are given in Table IV.

TABLE IV

| Formulation | Temp. (° C.) of the preheating step | Pre-cure time | % conversion just after precure |
|---|---|---|---|
| (1) 0.12 PC1 | 23* | 2 min | 79 |
| | 23* | 6 min | 87 |
| | 23* | 8 min | 89 |
| | 50 | 1 min | 89 |
| | 50 | 2 min | 90 |
| | 50 | 3 min | 92 |
| | 50 | 6 min | 92 |
| (8) 0.30 PC1 | 23* | 2 min | soft gel |
| | 23* | 4 min | 75 |
| | 23* | 6 min | 82 |
| | 50 | 2 min | 85 |
| | 50 | 6 min | 90 |

*comparative

Table IV clearly shows that UV blocking is reduced when the photochromic monomeric solution is pre-heated at 50° C. as evidenced by the improvement of the % conversion. Much longer exposure times are required at 23° C. to achieve a similar % conversion. Also, when higher levels of photochromics are employed and the blocking phenomenon is increased, the benefits are more apparent.

Example 5

Irgacure® 1850 is replaced in the formulations (1) 0.12 PC1 and (8) 0.30 PC1 of Example 4 by the same amount of Irgacure® 819.

In this example, the pre-cure intensity is again kept lower at about 14 mW/cm$^2$. The pre-cure exposure time is varied to obtain in each case a similar conversion percentage.

The results are given in Table V.

TABLE V

| Formulation | Temp. (° C.) of the preheating step | Precure time(s) | % conversion |
|---|---|---|---|
| (9) 0.12 PC1 | 25* | 300 | 99 |
| | 50 | 120 | 99 |
| (10) 0.30 PC1 | 25* | 300 | 96 |
| | 50 | 60 | 99 |

*comparative

The results show the benefit of the pre-heating step in time savings to reach similar conversion percentages.

Photochromic Performance

Lens photochromic properties are measured. A solar simulator source emitting a 50 klux visible and 6.7 W/m² UV light is used to the irradiate lens for 15 minutes for completely darkening the photochromic compounds. The amount of time to reach half of the optical density change ($T_{1/2}$dark) was determined. The source is then removed and the lenses returned to their original colorless state. The amount of time it took for the photochromic compounds to lighten and return to half of the optical density ($T_{1/2}$fade) was measured. In these examples, the lens is kept in a temperature controlled environment of 23° C. and followed ISO procedures.

Example 6

In this example, lenses from the previous examples are evaluated for photochromic performance at 23° C. A pre-cure exposure of 10 seconds at 30 mW/cm² followed by a final cure exposure of 50–185 mW/cm² in a temperature controlled environment of 70–90° C. are used.

Table VI shows that there is no photochromic compromise in pre-heating the monomer solution prior to UV light exposure. In all cases, the photochromic performance does not appear to be dependent upon pre-heating temperature and preheating does not deteriorate photochromic performance.

TABLE VI

| Formulation | Temp. (° C.) of the preheating step | % Tv | $T_{1/2}$ Dark(s) | $T_{1/2}$ Fade(s) | % T after 15 min dark | % T after 25 min Fade |
|---|---|---|---|---|---|---|
| (5) 0.08 PC1 | 25* | 89 | 27 | 74 | 26 | 75 |
| | 50 | 87 | 27 | 76 | 25 | 73 |
| (6) 0.08 Berry Red | 25* | 91 | 42 | 120 | 40 | 79 |
| | 50 | 88 | 43 | 128 | 38 | 76 |
| (7) 0.08 Plum Red | 25* | 78 | 19 | 24 | 34 | 75 |
| | 50 | 80 | 20 | 24 | 35 | 76 |

*comparative

Example 7

In this example, a wider range of photochromic concentration is evaluated using Irgacure® 1850. A pre-cure exposure of 10 seconds at 30 mW/cm² followed by a final cure exposure of 50–185 mW/cm² in a temperature controlled environment of 70–90° C. are used. Formulation (11) is a composition as in Example 1 but with 0.08 parts of PC1.

Table VII indicates similar conclusions as in Example 4 where the heating of the photochromic solution does not deteriorate photochromic performance. Higher photochromic levels appear to decrease the % Tv.

TABLE VII

| Formulation | Temp. (° C.) of the preheating step | % Tv | $T_{1/2}$ Dark(s) | $T_{1/2}$ Fade(s) | % T after 15 min dark | % T after 25 min Fade |
|---|---|---|---|---|---|---|
| (11) 0.08 PC1 | 25* | 89 | 25 | 61 | 25 | 76 |
| | 50 | 88 | 25 | 65 | 24 | 74 |
| (8) 0.30 PC1 | 25* | 82 | 24 | 68 | 18 | 67 |
| | 50 | 84 | 24 | 67 | 18 | 68 |
| | 70 | 81 | 24 | 70 | 8 | 66 |

*comparative

Example 8

Compositions of the previous examples are irradiated using the Dymax Light-Welder for 10 seconds at 45 mW/cm². A second UV light exposure of 150 mWcm² for 2 minutes was performed using the IST.

Table VIII results in similar conclusions as in Example 7 where the heating of the photochromic solution does not deteriorate photochromic performance. Higher photochromic levels appear to lower % Tv.

TABLE VIII

| Formulation | Temp. (° C.) of the preheating step | % Tv | $T_{1/2}$ Dark(s) | $T_{1/2}$ Fade(s) | % T after 15 min dark | % T after 30 min Fade |
|---|---|---|---|---|---|---|
| (1) 0.12 PC1 | 23* | 87 | 20 | 57 | 23 | 70 |
| | 50 | 87 | 20 | 60 | 22 | 70 |
| (2) 0.24 PC1 | 23* | 84 | 19 | 57 | 20 | 67 |
| | 50 | 84 | 19 | 59 | 19 | 66 |
| (3) 0.12 PC1 | 23* | 85 | 20 | 58 | 23 | 69 |
| | 50 | 87 | 21 | 63 | 23 | 69 |
| (4) 0.24 PC1 | 23* | 84 | 19 | 58 | 20 | 67 |
| | 50 | 84 | 20 | 63 | 20 | 66 |

*comparative

Example 9

A composition having the following formulation is prepared:

| Formulation (12) | |
|---|---|
| D121 | 73 |
| SR 9036 | 18.52 |
| Ethylmethacrylate | 7.40 |
| Crotylic alcohol | 1 |
| Irgacure ® 819 | 0.07 | and 0.08 parts by weight per 100 parts by weight of the above components of PC1 photochromic compound.

The composition is polymerized as in Example 6 with or without a pre-heating step.

The photochromic performances as well as refraction index, Abbe number and density of the cured lenses are given in Table IX. For comparison, the results for formulation (5) of Example 6 are also given in table IX.

TABLE IX

| Formulation | Pre-heating (° C.) temperature | % Tv | $T_{1/2}$ Dark(s) | $T_{1/2}$ Fade(s) | % T after 15 min dark | % T after 25 min fade | $n_e$ | Abbe number | density |
|---|---|---|---|---|---|---|---|---|---|
| (5) | 25* | 89 | 27 | 74 | 26 | 75 | 1.556 | 38 | 1.20 |
|  | 50 | 87 | 27 | 76 | 25 | 73 | 1.556 | 38 | 1.20 |
| (12) | 25* | 86 | 25 | 65 | 25 | 72 | 1.548 | 39 | 1.19 |
|  | 50 | 88 | 26 | 68 | 26 | 74 | 1.548 | 39 | 1.19 |

*comparative (ambient temperature)
D121: Diacryl ® 121 commercialized by Akzo (Bisphenol-A tetra ethoxy dimethacrylate)
SR9036: Bisphenol-A 30 ethoxylate dimethacrylate
Crotylic alcohol:

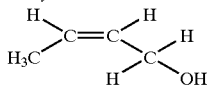

What is claimed is:

1. A method of manufacturing a photochromic molded article comprising the steps of:
   (a) filling a mold with a photopolymerizable monomer composition containing:
      at least one photopolymerizable monomer;
      at least one photoinitiator; and
      at least one photochromic compound capable of coloring upon ultraviolet irradiation;
   (b) photopolymerizing said photopolymerizable composition under irradiation with a light comprising a UV portion and optionally a UV-visible portion; wherein before the beginning of the photopolymerization step, said photopolymerizable composition is subjected to a pre-heating step in which the temperature of said photopolymerizable composition is increased to a temperature which at least reduces or prevents coloration of said at least one photochromic compound during the photopolymerization step.

2. The method of claim 1, wherein the photoiniatiator exhibits non-negligible absorption in the UV region.

3. The method of claim 1, wherein the said photoinitiator exhibits a main absorption in an ultraviolet region and a non-negligible absorption in the ultraviolet-visible region around 400 nm, and the irradiation light comprises a UV-visible portion having a wavelength spectrum around 400 nm.

4. The method of claim 1, wherein the increased temperature of the photopolymerizable composition in said pre-heating step ranges from 30 to 90° C.

5. The method of claim 1, wherein the increased temperature of the photopolymerizable composition in said pre-heating step ranges from 40 to 60° C.

6. The method of claim 1, wherein said pre-heating step is applied to the photopolymerizable composition prior to filling the mold with said photopolymerizable composition.

7. The method of claim 1, wherein said pre-heating step is selected from the group consisting of air oven heating, hot water heating, infra-red irradiation heating and microwave heating.

8. The method of claim 1, wherein the photopolymerizable composition does not contain any thermal initiator.

9. The method of claim 1, wherein the photopolymerization step is a two-step process comprising a pre-polymerization step followed by a further polymerization step with an irradiation of higher intensity than the pre-polymerization step.

10. The method of claim 3, wherein said at least one photoinitiator has a molar extinction coefficient at 400 nm of at least 150 lit/mol.cm or more.

11. The method of claim 1, wherein said at least one photoinitiator is selected from acylphosphine oxides and bisacylphosphine oxides.

12. The method of claim 1, wherein said at least one photopolymerizable monomer is selected from monomers of formula (I):

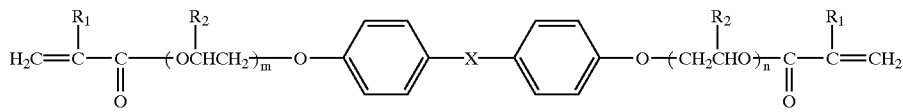

wherein
   $R_1$ and $R_2$, independently of each other, may represent hydrogen or a low $C_1$–$C_6$ alkyl radical, X represents —O—, —S—, —CO—, —CH$_2$—, —CH=CH—, or —C(CH$_3$)2-,
   m and n are integers and the sum n+m has an average value ranging from 0 to 10.

13. The method of claim 12, wherein the average value of the sum n+m ranges from 2 to 7.

14. The method of claim 12, wherein said at least one photopolymerizable monomer of formula (I) represents 50 to 100% by weight of the photopolymerizable monomers present in the composition.

15. The method of claim 1, wherein the photopolymerizable monomer composition comprises 0.001 to 1.0 parts by weight of said at least one photochromic compound per 100 parts by weight of photopolymerizable monomers.

16. The method of claim 1, wherein the said at least one photochromic compound is present at 0.05 to 0.5 parts by weight per 100 parts by weight of the photopolymerizable monomers.

17. The method of claim 1, wherein said at least one photochromic compound is selected from the group consisting of chromenes, spirooxazines and mixtures thereof.

18. The method of claim 1, wherein said at least one photochromic compound is selected from naphtopyrans.

19. The method of claim 1, wherein the photochromic article is an ophthalmic lens.

* * * * *

UNITED STATES PATENT AND TRADEMARK OFFICE
CERTIFICATE OF CORRECTION

PATENT NO. : 6,572,794 B1
DATED : June 3, 2003
INVENTOR(S) : Berzon et al.

It is certified that error appears in the above-identified patent and that said Letters Patent is hereby corrected as shown below:

Column 14,
Line 40, please delete

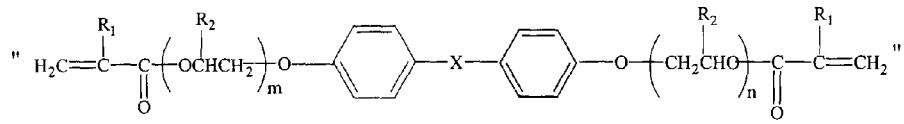

and insert

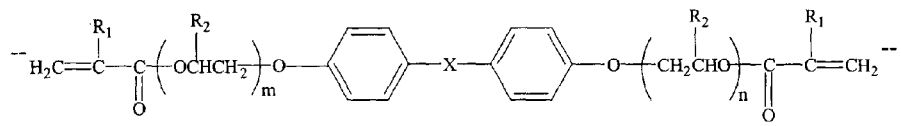

therefor.

Signed and Sealed this

Twenty-third Day of September, 2003

JAMES E. ROGAN
*Director of the United States Patent and Trademark Office*